US011234022B2

(12) United States Patent
Wassenberg et al.

(10) Patent No.: US 11,234,022 B2
(45) Date of Patent: Jan. 25, 2022

(54) ITERATIVE IDCT WITH ADAPTIVE NON-LINEAR FILTERING

(71) Applicant: GOOGLE LLC, Mountain View, CA (US)

(72) Inventors: Jan Wassenberg, Zurich (CH); Jyrki Alakuijala, Wollerau (CH); Sami Boukortt, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/907,545

(22) Filed: Jun. 22, 2020

(65) Prior Publication Data

US 2020/0322642 A1     Oct. 8, 2020

Related U.S. Application Data

(63) Continuation of application No. 16/299,275, filed on Mar. 12, 2019, now Pat. No. 10,708,626.
(Continued)

(51) Int. Cl.
*H04N 19/86* (2014.01)
*H04N 19/124* (2014.01)
(Continued)

(52) U.S. Cl.
CPC .......... *H04N 19/86* (2014.11); *H04N 19/117* (2014.11); *H04N 19/124* (2014.11); *H04N 19/14* (2014.11); *H04N 19/176* (2014.11)

(58) Field of Classification Search
None
See application file for complete search history.

(56) References Cited

U.S. PATENT DOCUMENTS

| 7,782,943 B2 * | 8/2010 | Jeon | H04N 19/573 |
| | | | 375/240.12 |
| 7,782,944 B2 * | 8/2010 | Jeon | H04N 19/597 |
| | | | 375/240.12 |

(Continued)

FOREIGN PATENT DOCUMENTS

WO    WO-2018068744 A1 *    4/2018    ............. H04N 19/86

OTHER PUBLICATIONS

Paris et al., "Bilateral Filtering: Theory and Applications," Foundations and Trends in Computer Graphics and Vision, vol. 4, No. 1, 2008. (Year: 2008).*

(Continued)

*Primary Examiner* — Reza Aghevli
(74) *Attorney, Agent, or Firm* — Young Basile Hanlon & MacFarlane, P.C.

(57) ABSTRACT

A method includes obtaining respective filtered pixels for pixels of a reconstructed image; and obtaining an edge-preserved image using the respective filtered pixels. Obtaining the respective filtered pixels includes, for each pixel of the reconstructed image, obtaining a respective filtered pixel by selecting a pixel patch including the pixel and first neighboring pixels of the pixel that are at relative neighboring locations with respect to the pixel; calculating respective weights for the first neighboring pixels; and filtering the pixel using the respective weights of the first neighboring pixels and the neighboring pixels to obtain the respective filtered pixel. Calculating the respective weights includes, for each neighboring pixel of the first neighboring pixels, forming a neighboring patch including the neighboring pixel and second neighboring pixels, and calculating a neighboring patch distance between the pixel patch and the neighboring pixel; and calculating a respective weight using the neighboring patch distance.

19 Claims, 9 Drawing Sheets

Related U.S. Application Data

(60) Provisional application No. 62/769,086, filed on Nov. 19, 2018.

(51) Int. Cl.
*H04N 19/14* (2014.01)
*H04N 19/117* (2014.01)
*H04N 19/19* (2014.01)
*H04N 19/176* (2014.01)

(56) References Cited

U.S. PATENT DOCUMENTS

| | | | | |
|---|---|---|---|---|
| 7,782,945 B2* | 8/2010 | Jeon | | H04N 19/50 375/240.12 |
| 7,782,946 B2* | 8/2010 | Jeon | | H04N 19/573 375/240.12 |
| 7,782,947 B2* | 8/2010 | Jeon | | H04N 19/50 375/240.12 |
| 7,782,948 B2* | 8/2010 | Jeon | | H04N 19/573 375/240.12 |
| 7,782,949 B2* | 8/2010 | Jeon | | H04N 19/50 375/240.12 |
| 7,782,950 B2* | 8/2010 | Jeon | | H04N 19/50 375/240.12 |
| 8,170,108 B2* | 5/2012 | Jeon | | H04N 19/573 375/240.16 |
| 8,363,732 B2* | 1/2013 | Jeon | | H04N 19/573 375/240.25 |
| 8,411,744 B2* | 4/2013 | Jeon | | H04N 19/50 375/240.12 |
| 8,428,130 B2* | 4/2013 | Jeon | | H04N 19/70 375/240.12 |
| 8,432,972 B2* | 4/2013 | Jeon | | H04N 19/597 375/240.16 |
| 8,457,207 B2* | 6/2013 | Jeon | | H04N 19/50 375/240.16 |
| 8,472,519 B2* | 6/2013 | Jeon | | H04N 19/573 375/240.12 |
| 8,483,273 B2* | 7/2013 | Jeon | | H04N 19/70 375/240.12 |
| 8,526,504 B2* | 9/2013 | Jeon | | H04N 19/70 375/240.25 |
| 8,559,505 B2* | 10/2013 | Jeon | | H04N 19/70 375/240.12 |
| 8,559,523 B2* | 10/2013 | Jeon | | H04N 19/50 375/240.25 |
| 8,565,303 B2* | 10/2013 | Jeon | | H04N 19/70 375/240.12 |
| 8,565,319 B2* | 10/2013 | Jeon | | H04N 19/50 375/240.25 |
| 8,571,113 B2* | 10/2013 | Jeon | | H04N 19/573 375/240.25 |
| 8,576,920 B2* | 11/2013 | Jeon | | H04N 19/573 375/240.25 |
| 8,611,419 B2* | 12/2013 | Jeon | | H04N 19/50 375/240.12 |
| 8,611,427 B2* | 12/2013 | Jeon | | H04N 19/70 375/240.25 |
| 8,634,475 B2* | 1/2014 | Jeon | | H04N 19/70 375/240.25 |
| 2003/0206587 A1* | 11/2003 | Gomila | | H04N 19/117 375/240.12 |
| 2003/0206664 A1* | 11/2003 | Gomila | | H04N 19/176 382/268 |
| 2005/0168644 A1 | 8/2005 | Demas et al. | | |
| 2009/0279608 A1* | 11/2009 | Jeon | | H04N 19/50 375/240.16 |
| 2010/0046619 A1* | 2/2010 | Koo | | H04N 19/105 375/240.12 |
| 2010/0091845 A1* | 4/2010 | Jeon | | H04N 19/176 375/240.12 |
| 2010/0098157 A1* | 4/2010 | Yang | | H04N 19/61 375/240.12 |
| 2010/0111183 A1* | 5/2010 | Jeon | | H04N 19/61 375/240.16 |
| 2010/0266042 A1* | 10/2010 | Koo | | H04N 19/70 375/240.16 |
| 2012/0082241 A1* | 4/2012 | Tsai | | H04N 19/117 375/240.25 |
| 2012/0236936 A1* | 9/2012 | Segall | | H04N 19/46 375/240.08 |
| 2013/0101027 A1 | 4/2013 | Narroschke et al. | | |
| 2015/0098509 A1* | 4/2015 | Sung | | H04N 19/597 375/240.16 |
| 2015/0350657 A1* | 12/2015 | Heo | | H04N 19/593 375/240.12 |
| 2016/0050437 A1* | 2/2016 | Nam | | H04N 19/176 375/240.12 |
| 2017/0238021 A1 | 8/2017 | Kao et al. | | |
| 2019/0342582 A1* | 11/2019 | Su | | H04N 19/186 |

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia System, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.

(56) References Cited

OTHER PUBLICATIONS

"VP8 Data Format and Decoding Guide, WebM Project", Google On2, Dec. 1, 2010, 103 pp.

* cited by examiner

|   | 0 | 1 | 2 | 3 | 4 | 5 | 6 | 7 |
|---|---|---|---|---|---|---|---|---|
| 7 | 230 | 221 | 222 | 157 | 73 | 22 | 235 | 213 |
| 6 | 141 | 84 | 201 | 95 | 15 | 53 | 41 | 189 |
| 5 | 205 | 35 | 215 | 195 | 4 | 216 | 71 | 167 |
| 4 | 155 | 53 | 176 | 194 | 176 | 214 | 42 | 157 |
| 3 | 26 | 154 | 69 | 45 | 190 | 12 | 8 | 252 |
| 2 | 195 | 55 | 225 | 241 | 59 | 60 | 124 | 150 |
| 1 | 254 | 232 | 244 | 145 | 20 | 245 | 223 | 185 |
| 0 | 105 | 216 | 44 | 41 | 229 | 77 | 22 | 252 |

FIG. 8

ITERATIVE IDCT WITH ADAPTIVE NON-LINEAR FILTERING

CROSS-REFERENCE TO RELATED APPLICATION(S)

This application is a continuation of U.S. application patent Ser. No. 16/299,275, filed Mar. 12, 2019, which claims priority to and the benefit of U.S. Provisional Application Patent Ser. No. 62/769,086, filed Nov. 19, 2018, the entire disclosures of which are hereby incorporated by reference.

BACKGROUND

Image content (e.g., still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artefacts, such as ringing artefacts, into the decompressed image. Higher compression levels can result in more observable ringing artefacts. It is desirable to minimize the ringing artefacts while maintaining high levels of compression.

SUMMARY

A first aspect is a method for preserving edges in a reconstructed image. The method includes selecting relative neighboring locations; obtaining respective filtered pixels for pixels of the reconstructed image; and obtaining an edge-preserved image using the respective filtered pixels. Obtaining the respective filtered pixels includes, for each pixel of the reconstructed image, obtaining a respective filtered pixel of the respective filtered pixels by selecting a pixel patch including the pixel and first neighboring pixels of the pixel, the first neighboring pixels being at the relative neighboring locations with respect to the pixel; calculating respective weights for the first neighboring pixels; and filtering the pixel using the respective weights of the first neighboring pixels and the neighboring pixels to obtain the respective filtered pixel. Calculating respective weights includes, for each neighboring pixel of the first neighboring pixels, forming a neighboring patch including the neighboring pixel and second neighboring pixels, the second neighboring pixels being at the relative neighboring locations with respect to the neighboring pixel, and calculating a neighboring patch distance between the pixel patch and the neighboring pixel; and calculating a respective weight of the respective weights for the neighboring pixel using the neighboring patch distance.

A second aspect is an apparatus for preserving edges in a reconstructed image. The apparatus includes a processor that is configured to determine respective patch-based distances between a pixel of the reconstructed image and first neighboring pixels of the pixel; determine respective weights using the respective patch-based distances; and filter the pixel using the respective weights and the first neighboring pixels to obtain a filtered pixel of an edge-preserved image.

A third aspect is a non-transitory computer-readable storage medium that includes executable instructions that, when executed by a processor, facilitate performance of operations for preserving edges in a reconstructed image. The operations include operations to determine respective patch-based distances between a pixel of the reconstructed image and first neighboring pixels of the pixel; determine respective weights using the respective patch-based distances; and filter the pixel using the respective weights and the first neighboring pixels to obtain a filtered pixel of an edge-preserved image.

These and other aspects of the present disclosure are disclosed in the following detailed description of the embodiments, the appended claims, and the accompanying figures.

BRIEF DESCRIPTION OF THE DRAWINGS

FIG. 8 illustrates an example of an edge-preserving filter according to implementations of this disclosure.

DETAILED DESCRIPTION

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to the quantizing of frequency domain information (as further described below).

Lossy compression aims to describe (i.e., code, compress, etc.) an image with the least number of bits while preserving, as much as possible, the quality of the image when the compressed image is decompressed. That is, lossy compression techniques seek to compress an image without degrading the quality of the image beyond an unacceptable level that would be perceivable, for example, by the human eye.

Fewer bits can be used to describe slow-changing areas and/or objects of the image than can be used to describe fast-changing areas and/or objects. "Slow-changing" and "fast-changing" in this context refer to changes in the frequency domain. In an example, an image, such as an image 910 of FIG. 9, includes a sky that forms the background of the image 910 and branches that occlude at least part of the background. The areas covered by the sky background, such as an area 902, are slow-changing areas. That is, the slow-changing areas correspond to spatially low frequency areas. The areas of the image 910 that include the transitions between the background sky and the branches, such as an area 904, are fast-changing areas. That is, the fast-changing areas correspond to spatially high frequency areas. An area 906 (i.e., a portion of the tree trunk) illustrates another example of slow-changing areas. As such, the image 910 illustrates that the background sky includes mostly slow-changing areas but also includes fast-changing areas.

As further described below, encoding an image or an image of a video (i.e., a frame of a video) can include partitioning the image into blocks. As used herein, both "image" and "picture" refer to a single image or to a frame of a video. A block can include slow-changing areas (i.e., low frequency signals) and fast-changing areas (i.e., high frequency signals). Techniques for modeling (e.g., encoding) fast-changing areas may not capture (e.g., properly and/or optimally encode) slow-changing areas.

Figure 9:
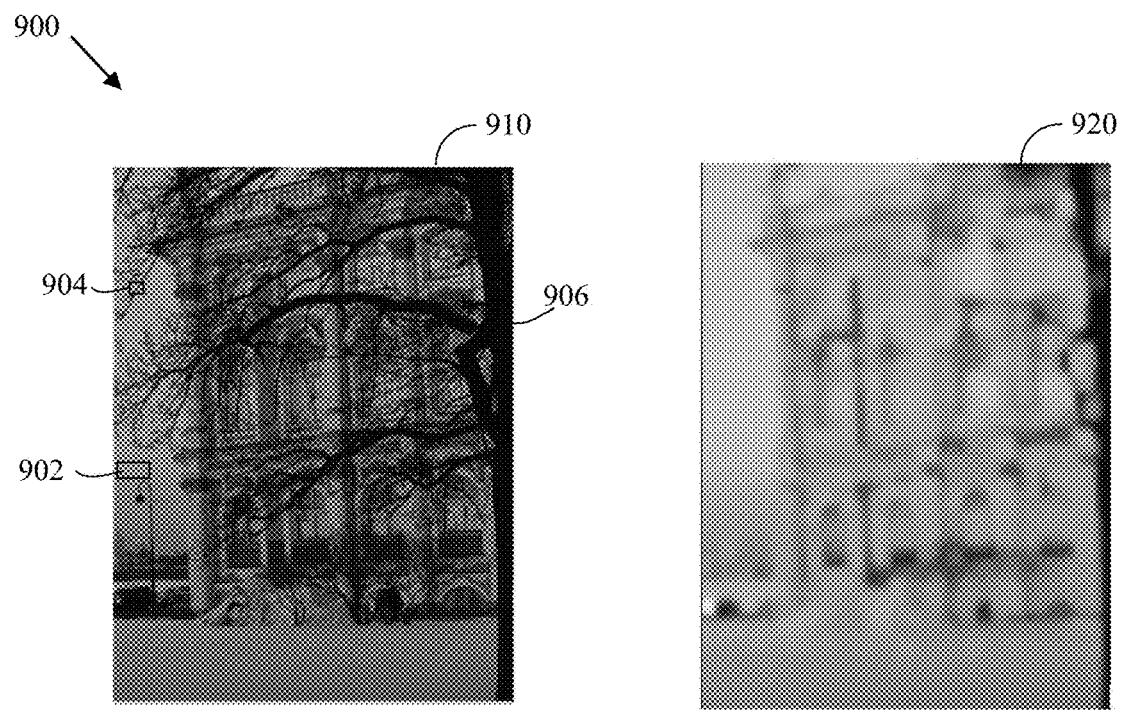
FIG. 9 illustrates an example of modeling maximum brightness in localities of an image according to implementations of this disclosure.

Lossy compression techniques can produce undesirable artefacts, such as ringing artefacts, which appear at sharp transitions in an image (e.g., at the edges between the sky and the branches in the area 904 of FIG. 9). Ringing artefacts can result from compressing high frequency signals. Ringing artefacts may appear as bands and/or ghosts near edges of objects in a decompressed image. Area 912 of FIG. 9 illustrates an example of ringing. The ringing artefacts are due to undershoots and overshoots around edges. "Undershoot" means that a value of a pixel in the decompressed image is less than the value of the same pixel in the source image. That is, "undershoot" can mean that pixels around the edges are de-emphasized. "Overshoot" means that a value of a pixel in the decompressed image is greater than the value of the same pixel in the source image. That is, "overshoot" can mean that some pixels around the edges are accentuated. That is, as a result of the lossy compression, some parts of a bright (dark) background can become even brighter (darker) in the decompressed image.

Overshoots and undershoots can result from frequency-domain sinc-type oscillations. For example, in an image that includes a bright (dark) background that is partially occluded by a dark (bright) foreground object, a step-like function exists at the edge of the background and the foreground object. If the edge is compressed based on a frequency-based transform, increased levels of quantization result in the sinc-type oscillations at the proximity of the edge due to the frequency-limiting properties of quantization. As mentioned, undershoots and overshoots can be observed around the edge. Examples of the frequency-based transform (also referred to as "block-based transforms") include, as further described below, a Discrete Cosine Transform (DCT), a Fourier transform (FT), a Discrete Sine Transform (DST), or the like.

Some techniques have been used to reduce ringing in a decoded (i.e., decompressed) image. Such techniques include blurring, Gaussian filters, and/or other loop-filtering techniques. Such techniques can be computationally expensive and/or have undesirable blurring effects. For example, such techniques may not preserve source image details (such as edges) or fine image textures. Such techniques may change the observable quality of textures and materials in source images. For example, instead of a glossy whiteboard in a source image, the whiteboard may appear grainy in the decoded image. Texture loss may be undesirable, at least in certain applications and/or contexts. For example, in the context of on-line shopping, it is critical to preserve textures, material properties, and fine details in the images (e.g., the decoded image) that on-line shoppers see, such as in a web-browser, while browsing an on-line store or catalogue.

Implementations according to this disclosure can reduce ringing and other artefacts attributable to quantization. Implementations according to this disclosure can produce, within a reasonable computation time, decompressed images with reduced ringing and blocking effects while preserving, at least partially, finer source image details, such as edges.

Whereas noise in a decoded image cannot be completely separated from the structure of the image, implementations according to this disclosure can be used to counter balance the effects of over- or under-smoothing (i.e., over- or under-filtering) of decoded images so that a decoded image more accurately resembles an original image of the decoded image. As mentioned above, in the case of over-smoothing, details of the original image can be lost due to the smoothing; and in the case of the under-smoothing, the decoded image can look too jagged as compared to the original image. After applying a smoothing filter to a decoded image and transforming the decoded and smoothed image into frequency domain coefficients, clamping the frequency domain coefficients to their most plausible original values, as further described below, can counter balance the effects of over- or under-smoothing.

"Pixel value" means the value of a color component of the color model used for the image. For example, the color model can be based on a luminance component (Y) and two chrominance components (U and V or Cb and Cr), which may be referred to as the YUV or YCbCr color model, or color space. Other color models can be used. Additionally, for ease of explanation and reference, "pixel" can refer to a pixel value, a pixel location, or both.

Details of iterative IDCT with adaptive non-linear filtering is further described below. At a high level, iterative IDCT with adaptive non-linear filtering can be described as receiving, in a data stream, and in the form of transform coefficients, pixel values; smoothing the pixel values; converting the smoothed pixel values to the smoothed transform coefficients; and if any of the smoothed transform coefficients go out of bounds, which is determined by comparing the smoothed transform coefficients to the transform coefficients received in the data stream, then clamping the smoothed transformed coefficients to the original (plausible) values received in the data stream.

Using the techniques described herein, noise, such as ringing artefacts can be reduced while preserving edges in the decoded image. Any remaining noise (such as ringing artefacts) may not be perceivable by the human eye. The histogram of the image, at least in the proximity of edges, can be substantially preserved, which results in a more natural image (i.e., the decompressed image substantially matching the source image). That is, the distribution of pixel values in the source image can be relatively intact in the decompressed image. That is, for example, and with reference to the image 910 of FIG. 9, the dark branches of the tree do not cause a brighter sky around the edges: the local histogram of the source image (i.e., before compression) in the proximity of the branches is preserved.

Implementations according to this disclosure can be applied, for example, to images, whereby at least one or more of the following conditions applies: a transform (e.g., a DCT, a DST, etc.) is used in encoding the image, the image includes a smooth background (e.g., a sky) that can make ringing artefacts noticeable, a high contrast and high-information content object occludes the background, and/or the high-information content object is either darker or lighter than the background.

Details of iterative IDCT with adaptive non-linear filtering are described herein with initial reference to a system in which the teachings herein can be implemented.

Figure 1:
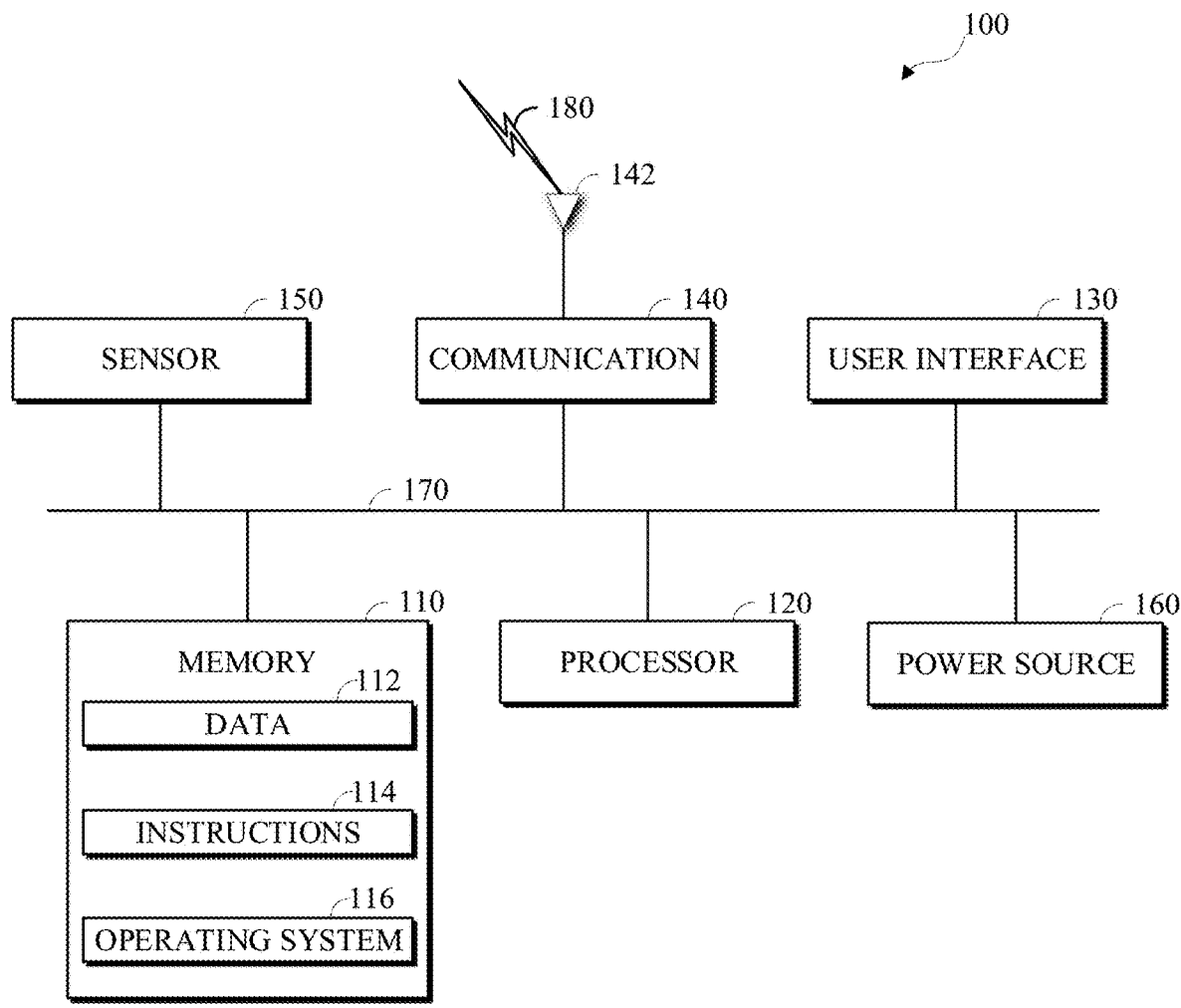
FIG. 1 is a diagram of a computing device in accordance with implementations of this disclosure.

FIG. 1 is a diagram of a computing device 100 (e.g., an apparatus) in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated in any number of separate physical units. For example, the user interface 130 and processor 120 can be integrated in a first physical unit, and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuit (ASIC), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special-purpose processor, or circuitry, that can include specialized hardware for carrying out any of the methods, algorithms, aspects, or combinations thereof, as described herein. Portions of the instructions 114 can be distributed across multiple processors on the same machine or different machines or across a network, such as a local area network, a wide area network, the Internet, or a combination thereof.

The processor 120 can include any device or system, now-existing or hereafter developed, capable of manipulating or processing a digital signal or other electronic information, including optical processors, quantum processors, molecular processors, or a combination thereof. For example, the processor 120 can include a special-purpose processor, a central processing unit (CPU), a digital signal processor (DSP), a plurality of microprocessors, one or more microprocessors in association with a DSP core, a controller, a microcontroller, an Application Specific Integrated Circuit (ASIC), a Field Programmable Gate Array (FPGA), a programmable logic array, a programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber-optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motionsensing device, or a combination thereof. For example, the sensor 150 may include a sound-sensing device, such as a microphone, or any other sound-sensing device, now existing or hereafter developed, that can sense sounds in the proximity of the computing device 100, such as speech or other utterances, made by a user operating the computing device 100. In another example, the sensor 150 may include a camera, or any other image-sensing device, now existing or hereafter developed, that can sense an image, such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160 may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof, can be integrated in one or more electronic units, circuits, or chips.

Figure 2:
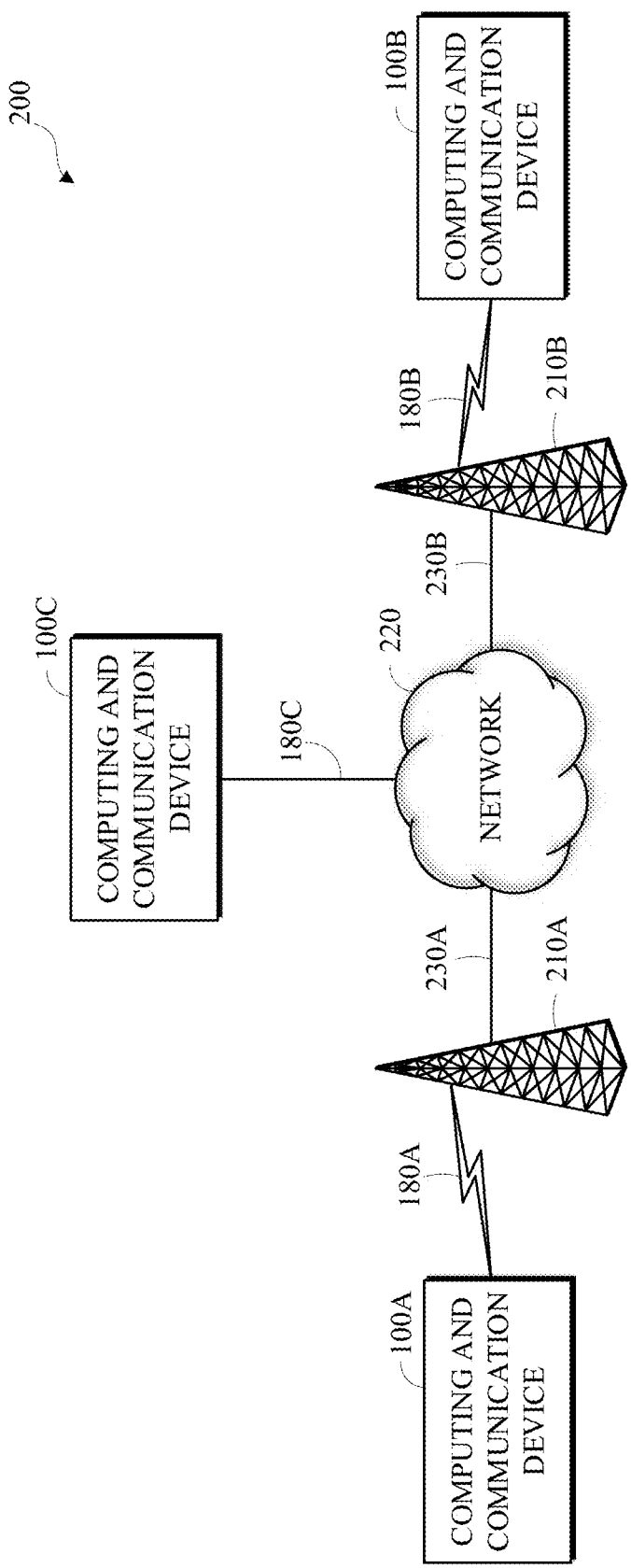
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communications system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, or 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof, audio data; and one or both of the computing and communication device 100A and the computing and communication device 100B may receive, decode, process, store, present, or a combination thereof, the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication devices 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the Transmission Control Protocol (TCP), the User Datagram Protocol (UDP), the Internet Protocol (IP), the Real-time Transport Protocol (RTP), the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown, the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
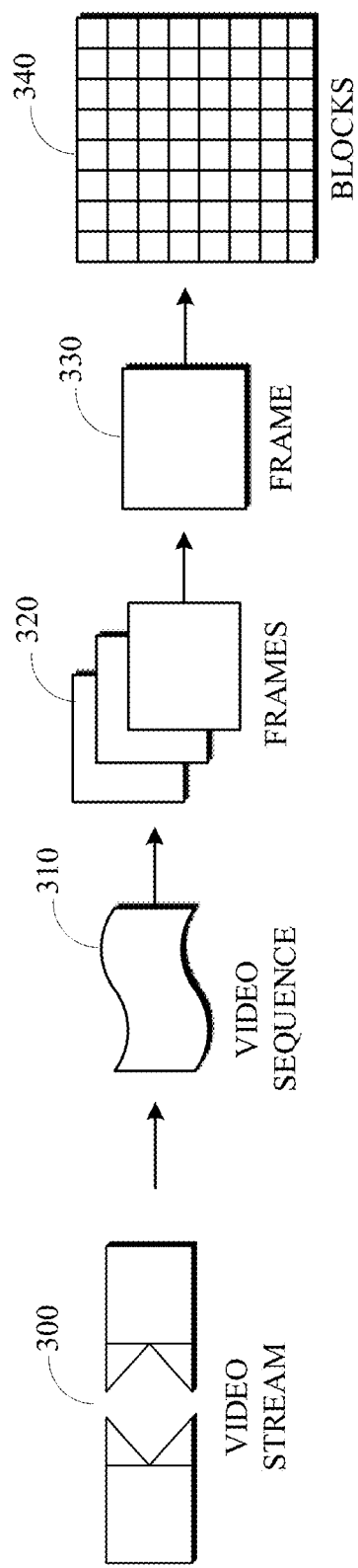
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term "block" can include a superblock, a macroblock, a segment, a slice, or any other portion of a frame. A frame, a block, a pixel, or a combination thereof, can include display information, such as luminance information, chrominance information, or any other information that can be used to store, modify, communicate, or display the video stream or a portion thereof.

In some implementations, a frame that is not part of a video stream is encoded and decoded in accordance with implementations of this disclosure.

Figure 4:
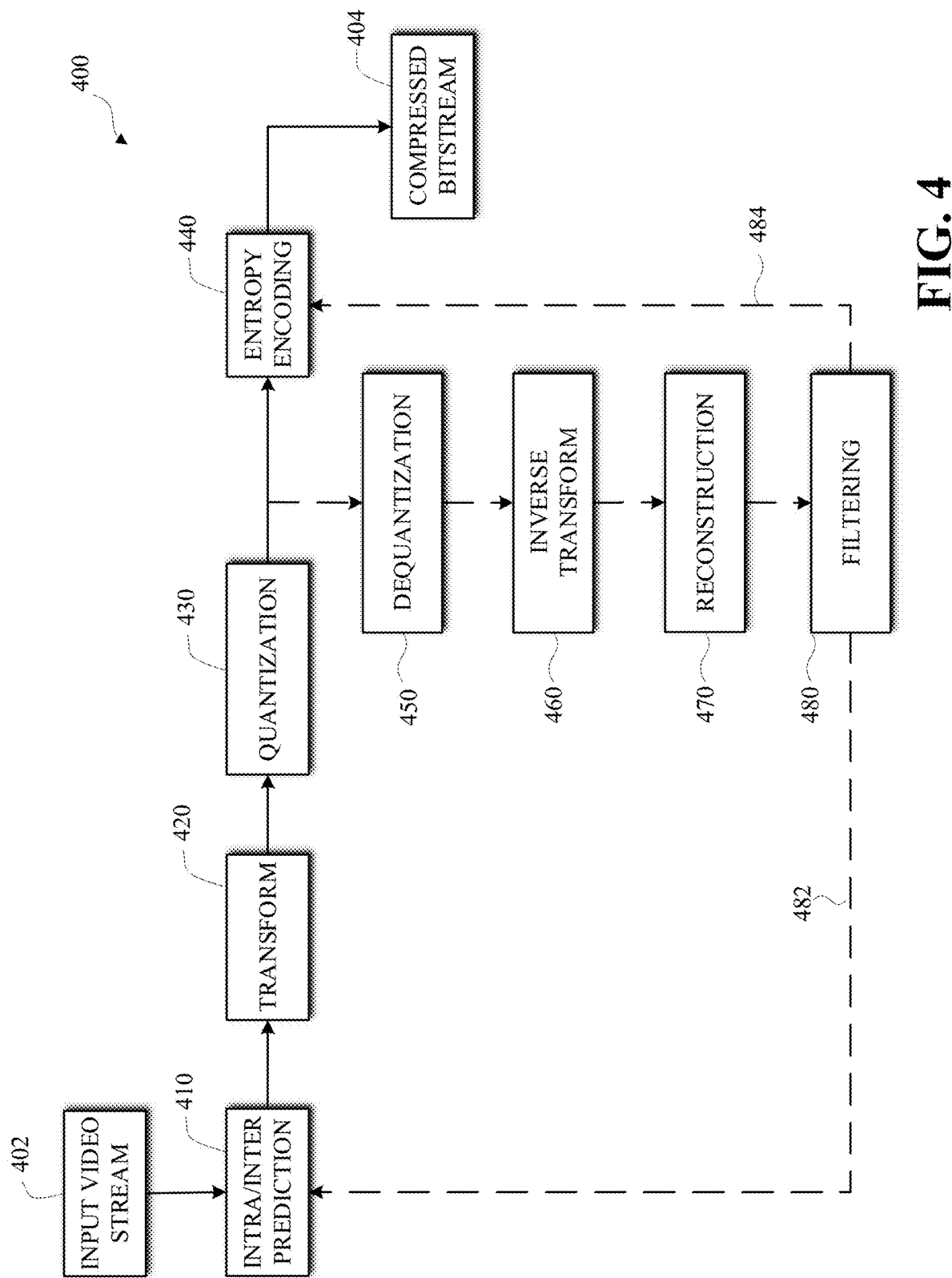
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to encode video data as described herein. The encoder 400 can be implemented as specialized hardware included, for example, in the computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The input video stream 402 can be a single image or a collection of images. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), the Fourier transform (FT), the Discrete Sine Transform (DST), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
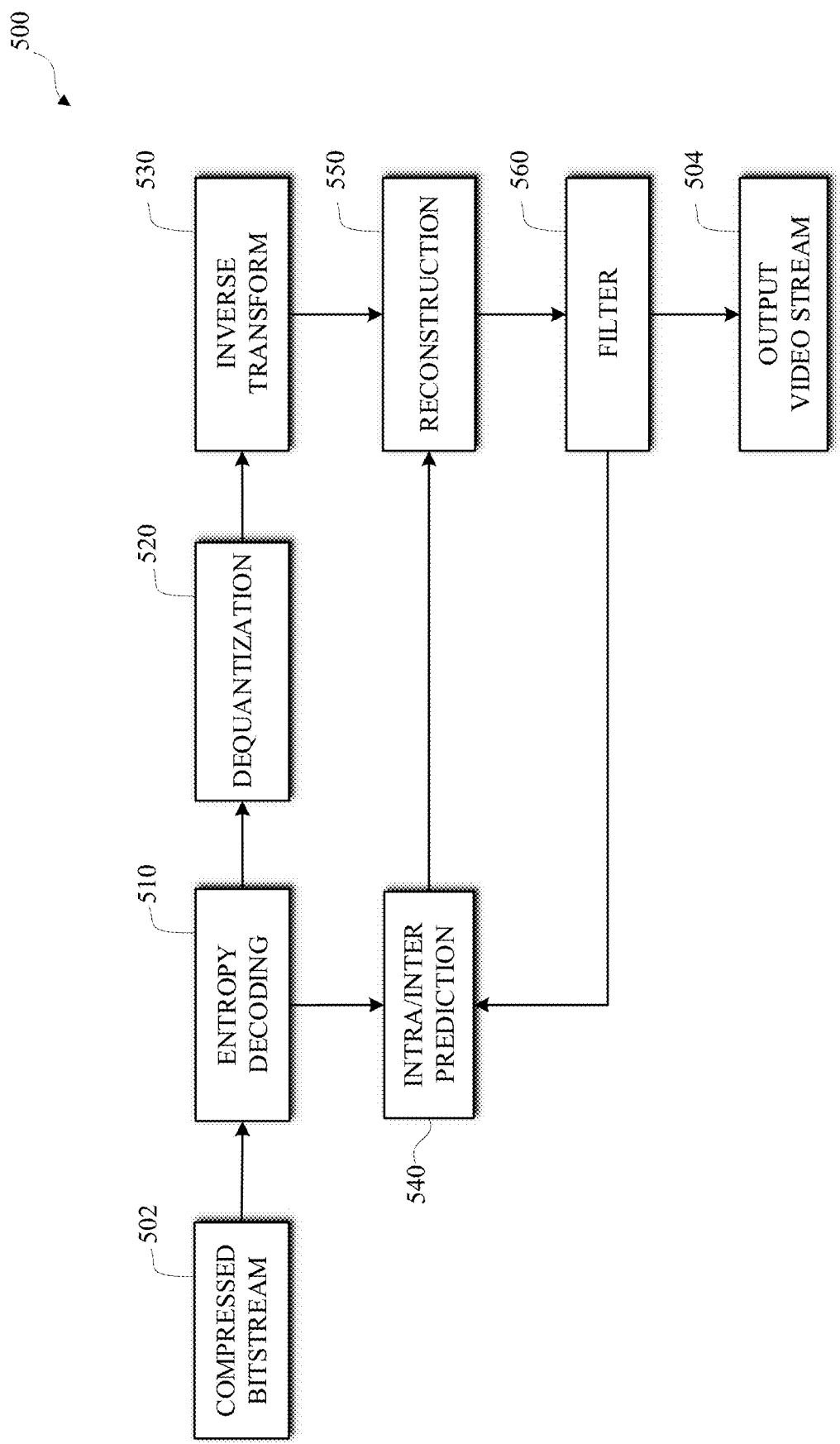
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artefacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to decode video data as described herein. The decoder 500 can be implemented as specialized hardware included, for example, in the computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artefacts, such as blocking artefacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
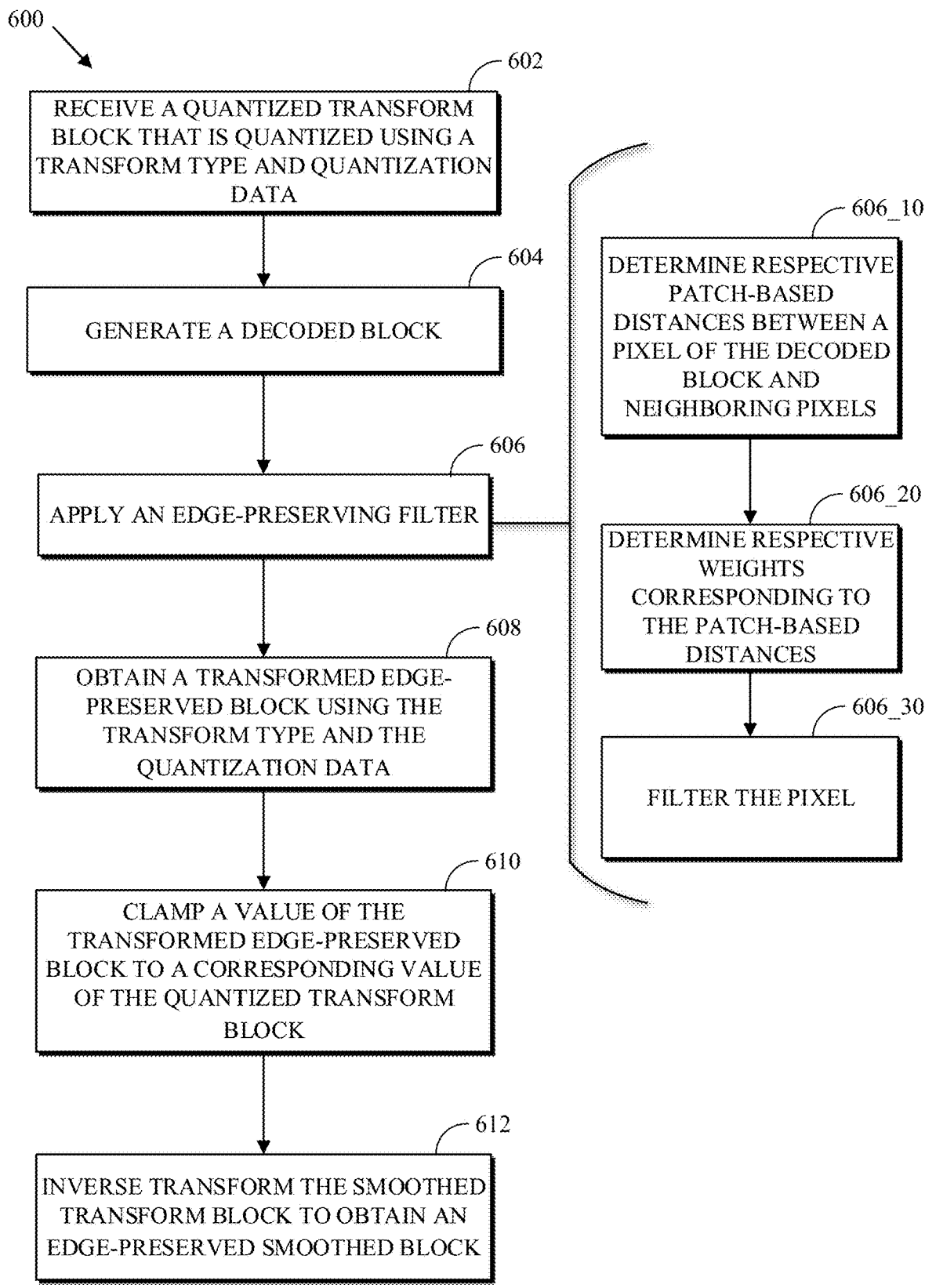
FIG. 6 is an example of a process for decoding a block of a reconstructed image according to an implementation of this disclosure.

FIG. 6 is an example of a process 600 for decoding a block of a reconstructed image according to an implementation of this disclosure. The image can be a reconstructed single image or a reconstructed frame of a video sequence. As such, the reconstructed image can be an image that is output from a reconstruction stage of a coded (i.e., an encoder or a decoder). For example, the reconstructed image can be an image that is generated by a reconstruction unit of an encoder, such as the reconstruction unit 470 of FIG. 4. For example, the reconstructed image can be an image that is generated by a reconstruction unit of a decoder, such as the reconstruction unit 550 of FIG. 5. The reconstructed image can be a reconstructed image to which one or more filters (such as a deblocking filer) have been applied. For example, a filtering unit, such as the filtering unit 480 of FIG. 4, may have applied one or more filters to the reconstructed image that is output from the reconstruction unit 470. For example, a filtering unit, such as the filtering unit 560 of FIG. 5, may have applied one or more filters to the reconstructed image that is output from the reconstruction unit 550.

The block includes pixels, and each pixel has a corresponding pixel value. The pixel value can be a luminance Y value, a chrominance U value, a chrominance V value, or other color component value.

The process 600 can be implemented, for example, as a software program that may be executed by computing devices, such as the computing and communication devices 100A, 100B, 100C. The software program can include machine-readable instructions that may be stored in a memory, such as the memory 110, and that, when executed by a processor, such as the CPU 120, can cause the computing device to perform the process 600.

When implemented in or by a decoder, operations of the process 600 can be implemented in whole or in part in the dequantization unit 520, the inverse transform unit 530, the reconstruction unit 550, the filtering unit 560, other units, a transform unit that performs transformation such as described with respect to the transform unit 420 of FIG. 4, or any combination thereof of the decoder 500.

When implemented in or by an encoder, operations of the process 600 can be implemented in whole or in part in the transform unit 420, the dequantization unit 450, the inverse transform unit 460, the reconstruction unit 470, the filtering unit 480, other units, or any combination thereof of the encoder 400.

The process 600 can be implemented using specialized hardware or firmware. Multiple processors, memories, or both, may be used.

Figure 7:
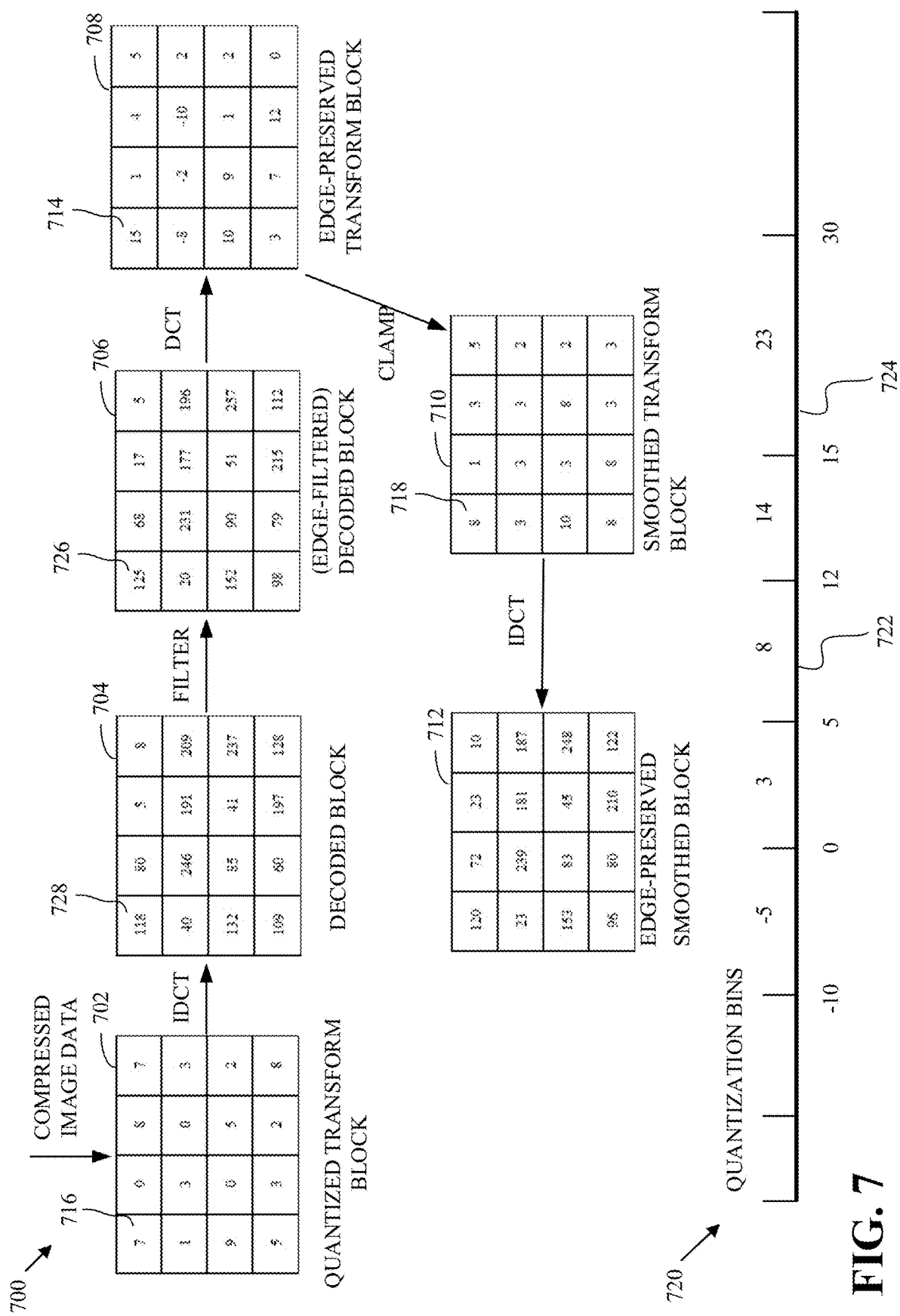
FIG. 7 illustrates an example of decoding a block of a reconstructed image according to implementations of this disclosure.

To simplify the explanation of the process 600, a high-level process of decoding a block of a reconstructed image is described with reference to FIG. 7. FIG. 7 illustrates an example 700 of decoding a block of a reconstructed image according to implementations of this disclosure. A person skilled in the art will appreciate that the example 700 is a simplified example of decoding a block of a reconstructed image and that many operations are omitted. Similarly, the example 700 may include operations and steps that are not performed by the process 600.

As further explained below, the example 700 includes transform blocks (i.e., blocks of quantized transform coefficients that are in the frequency domain), such as transform blocks 702 and 708; and image blocks (i.e., blocks of values that are in the pixel domain), such as blocks 704, 706, and 712. For simplicity of explanation, the example 700 shows a one-to-one correspondence between image blocks and transform blocks. That is, the example 700 shows that one image block corresponds to one transform block. However, that need not be the case. For example, multiple transform blocks can correspond to one image block. As such, when multiple transform blocks correspond to one image block, each of the multiple transform blocks can be processed as described with respect to FIG. 6 or 7 in order to generate the corresponding image block.

Additionally, while blocks of size 4×4 are shown in FIG. 7 for simplicity, the disclosure herein is not so limited. The transform blocks of FIG. 7 can be of any size. The pixel blocks of FIG. 7 can be of any size.

A quantized transform block 702 is received in a compressed image data stream. The compressed image data stream can be the compressed bitstream 502 of FIG. 5. The compressed image data stream can be an image data stream that is an output of the quantization unit 430 of FIG. 4. As such, the quantized transform block 702 includes quantized transform coefficients. The quantized transform block 702 is generated using a transform type. As described above, the transform type can be, for example, a DCT, a DST, a KLT, an ADST, or any other transform type.

As is known, when a block of pixel values is transformed, into the frequency domain, using a transform type, to retrieve the block of pixel values from the transform block, an inverse of the transform type is used. For example, if the DCT is used as the transform type, then an inverse DCT (IDCT) is used to retrieve the block of pixel values. For simplicity of explanation, the example 700 is described with respect to the DCT and IDCT. However, the disclosure herein is not so limited, and any transform and inverse transform type can be used.

While not specifically shown in the example 700, the quantized transform block 702 may be generated using quantization data. The quantization data can be a quantization parameter. The quantization data can be adaptive quantization field data. The adaptive quantization field data represent weights applied to quantization values used to encode blocks. Briefly, adaptive quantization field data includes values indicative of the quantization levels used to encode different areas of a frame. When encoding a frame, by an encoder, the values of the adaptive quantization field data are determined by analyzing the entire frame, such as to determine the areas in which to apply a higher or lower weight to the quantization.

In the case of non-adaptive quantization, and as is known in an example, an image can be split into blocks and each block can be transformed into transform coefficients in the frequency domain. Each of the transform coefficients of the transform block can be quantized according to a quantization value. The quantization value is set according to the frequency of the structure of the image. As such, a first quantization value is used for low frequency and a different second quantization value is used for high frequency. That is, the quantization values (i.e., one per frequency), are typically constant for every block of the image.

Contrastingly, with adaptive quantization, different quantization parameters can be used for every image block and within each block for each frequency. Accordingly, with adaptive quantization, for example, more quantization can be performed in flat areas (i.e., blocks) of the image than in areas of the image that include edges. In an example, the adaptive quantization field data can be included, by an encoder, in a compressed bitstream, such as the compressed bitstream 404 of FIG. 4. A decoder receives the adaptive quantization field data in a compressed bitstream, such as the compressed bitstream 502 of FIG. 5. In an example, the adaptive quantization field data can be included in the compressed bitstream as a quantization map that indicates, for each image block, the respective adaptive quantization data. As can be appreciated, the respective adaptive quantization data, per image block, can be indicative of the amount of data loss due to quantization.

A decoded block 704 is generated by steps including inverse transforming the quantized transform block 702. For example, the IDCT and the quantization data (such as the adaptive quantization field data) can be used to generate the decoded block 704. While not specifically shown in the example 700, and for simplicity of the example 700, details are omitted from FIG. 7. For example, the decoded block 704 is a block of a reconstructed frame. As such, the decoded block 704 is a block that is output from the reconstruction unit 470 of FIG. 4, in the case of an encoder, or the reconstruction unit 550 of FIG. 5, in the case of a decoder. In some examples, the decoded block 704 may be a block that has been filtered by at least one filter of the filtering unit 480 of FIG. 4, in the case of an encoder, or the filtering unit 560 of FIG. 5, in the case of a decoder. In an example, the at least one filter can be or can include a deblocking filtering, as described above.

As the decoded block 704 is a reconstructed frame, it is understood that in the case that the quantized transform block 702 includes transform coefficients of a residual block, then generating the decoded block 704 from the quantized transform block includes inverse transforming the quantized transform block 702 to generate a residual and adding the residual block to one or more prediction blocks to generate the decoded block 704. In the case that the quantized transform block 702 includes transform coefficient of an image block (as opposed to a residual block), then the decoded block 704 is generated without the use of a prediction block.

An edge-preserving filter is applied to the decoded block 704 to obtain the edge-filtered decoded block 706. Any edge-preserving filter can be applied. The "edge-preserving" aspect of the filter is important to preserve fine, line structures (e.g., a telephone line or a tree branch against a clear blue sky) in the decoded image. The edge-preserving filter retains (e.g., does not destroy, such as by blurring or smoothing) such fine details in the decoded image while still smoothing the decoded image.

Various edge-preserving filters can be used. In an example, a bilateral filter can be used. In another example, a non-local means (NLM) filter can be used. An NLM filter makes use of patches, instead of individual pixels and uses L2 distances, such as the sum of square distances. However, NLM is known to be computationally expensive.

In another example, an edge-preserving filter that is based on machine learning can be used. A machine learning model can be trained to output a denoised image block from an input image block that may contain noise that is due to quantization. In an example, training pairs can be used to train the machine learning model. A training pair can include a first image block that includes a high level of noise and a second image block that includes a lower level of noise, where the noise is attributable to quantization. For example, the output of a decompression process that uses a high quantization value for encoding an image block can be the first block of a training pair, and the output of decompressing the block by encoding it using a lower quantization value can be the second image block of the training pair.

Yet another edge-preserving filter that is described below with respect to FIG. 8 can be used. The edge-preserving filter described with respect to FIG. 8 can be 10 to 20 times faster than NLM. The transform type that is used to generate the quantized transform block 702 is applied to the edge-filtered decoded block 706 to obtain (e.g., generate, calculate, etc.) an edge-preserved transform block 708. In the case of an encoder, a transform unit, which can be or can perform similar functions to, the transform unit 420 of FIG. 4 can be used to obtain the edge-preserved transform block 708. In the case of a decoder, a transform unit, which can perform functions similar to those of the transform unit 420 of FIG. 4 can be used. As such, a decoder, such as the decoder 500 of FIG. 5, can include a transform unit to perform a block-based transform, which can include transforming a block into transform coefficients.

The coefficients of the edge-preserved transform block 708 are clamped to their most plausible original range values to obtain the smoothed transform block 710. That is, each transform coefficient of the edge-preserved transform block 708 may be clamped based on its co-located original (i.e., before smoothing) value in the quantized transform block 702.

For example, the quantization data can include or can be used to derive or imply quantization bins 720. Each bin can have a lower bound and an upper. For example, a bin 722 has a lower bound of 5 (inclusive) and an upper bound 12 (exclusive). That is the bin 722 can be represented by the interval [5, 12). Any values that are within the interval of a bin can be quantized to one of the values of the interval. For example, the values within an interval can be quantized to the middle value of the bin, the lower bound of the bin, or any other value of the bin. For example, any of the values 6, 11.65, 8, 5.34, and so on, are quantized to the value 8, which is the middle value of the bin 722. For simplicity, the middle values of the bins in the quantization bins 720 are shown as rounded values.

To obtain the values of the smoothed transform block 710, if a coefficient of the edge-preserved transform block 708 is not within the same bin as the co-located coefficient of the quantized transform block 702, then the value of the smoothed transform block 710 is clamped to some value that is closer to the co-located coefficient.

In an example, a value is clamped to the middle of the bin of the co-located coefficient. For example, a coefficient 714, which has a value of 15, is in a bin 724 of the quantization bins 720. A co-located coefficient 716, which has a value of 7, is in the bin 722. As such, the coefficient 714 is clamped to, for example, the middle of the bin 722. Accordingly, a coefficient 718 is set to the middle of the bin 722 (namely, the value 8) in the smoothed transform block 710. The other coefficients of the edge-preserved transform block 708 are similarly clamped.

Asymmetric or uneven clamping is another example of clamping, which can be summarized as: if the original value is 'far' from the origin (a base or zero value), don't let the smoothing symmetrically clamp the value. If a value X is rescaled such that a quantization bin has width 1, then the even clamping tolerance would be [X−0.5, X+0.5]. Said yet another way, even clamping would add (i.e., +0.5) or subtract (i.e., −0.5). With asymmetric clamping, if X is further from zero (i.e., the origin), then the clamped value is less tolerant to smoothing that would bring the value of X close to zero. For example, if X is 0.6, and using the adjustment factors described with respect to Table I, then asymmetric clamping would clamp X to [0.4, 1.1].

This type of clamping, which is illustrated by the function AsymmetricClamp in Table I below, can measurably improve the smoothing and can result in less blurring of the smoothed image.

TABLE I

| 1 | float AsymmetricClamp(float original, float smoothed) { |
| 2 |    const float is_neg = original < −0.5f; |
| 3 |    const float is_pos = original > 0.5f; |
| 4 |    const float add = is_neg ? 0.2f : 0.5f; |
| 5 |    const float sub = is_pos ? 0.2f : 0.5f; |
| 6 |    return min(max(original − sub, smoothed), original + add); |
| 7 | } |

The function AsymmetricClamp receives, as input, an original value (such as the co-located coefficient 716) and a smoothed value (such as the coefficient 714); and returns a clamped value (such as the coefficient 718). The adjustment factors of 0.2 (a first factor) and 0.5 (a second factor) are but an example. Other adjustment factors are also possible. The first factor can be smaller than the second factor. Alternatively, the first factor can be greater than the second factor.

The function AsymmetricClamp can be described as follows and/or can have the following effect: If the smoothed value and the original values have the same sign (i.e., they are both negative or both positive) and if the absolute value of the smoothed value is greater than the absolute value of the original value, then the original value is adjusted toward the smoothed value by no more than the second factor; otherwise the original value is adjusted toward the smoothed value by no more than the first factor. Table II illustrates examples of the inputs and outputs of the AsymmetricClamp function.

TABLE II

| original | smoothed | output |
|---|---|---|
| −2 | −1 | −1.8 |
| −2 | −5 | −2.5 |
| −2 | −1.5 | −1.8 |
| −2 | 5 | −1.8 |
| −2 | −10 | −2.5 |
| −2 | −2 | −2 |
| −2 | −2.1 | −2.1 |
| −2 | −2.6 | −2.5 |
| −2 | −1.9 | −1.9 |
| −2 | 100 | −1.8 |
| 0 | −1000 | −0.5 |
| −2 | −3 | −2.5 |
| −2 | −2.4 | −2.4 |
| 2 | 1000 | 2.5 |

As mentioned above, the smoothed transform block 710 is in the frequency domain. To obtain the reconstructed, edge-preserved and smoothed image block that is in the pixel domain (i.e., an edge-preserved smoothed block 712), the smoothed transform block 710 can be inverse quantized, using the quantization data, and inverse transformed, using the inverse transform (e.g., IDCT). In the case where the smoothed transform block 710 is a transform block of residual data, then the dequantized and inverse transformed block can be added to the prediction block described with respect to the decoded block 704 to obtain the edge-preserved smoothed block 712.

In an example, the process described with respect to FIG. 7 can be iteratively repeated. For example, in the next (or subsequent) iteration, the edge-preserved smoothed block 712 can be treated as (i.e., can become) the decoded block 704 and the process, as described above, can be applied. Iteratively repeating the process of FIG. 7 can improve the denoising effect of the edge-preserving filter. This is so because denoising an already denoised block can improve the strength of the denoising. That is, the noise can be further suppressed by iteratively applying the process of FIG. 7.

Returning to FIG. 6, at 602, the process 600 receives a quantized transform block. The quantized transform block can be as described with respect to the quantized transform block 702 of FIG. 7. The quantized transform block can be such that an encoder, such as the encoder 400 of FIG. 4, used quantization data and a transform type to generate the quantized transform block. In an example, the quantization data can be, or can include, adaptive quantization field data. In an example, the transform type can be the DCT.

At 604, the process 600 generates a decoded block from the quantized transform block. The decoded block can be as described with respect to the decoded block 704 of FIG. 7. At 606, the process 600 applies an edge-preserving filter to the decoded block to obtain an edge-filtered decoded block, such as the edge-filtered decoded block 706 of FIG. 7. As mentioned above, an example of an edge-preserving filter is described with respect to FIG. 8.

At 608, the process 600 obtains, using the transform type and the quantization data, a transformed edge-preserved block from the edge-filtered decoded block. The transformed edge-preserved block can be as described with respect to the edge-preserved transform block 708 of FIG. 7. At 610, the process 600 clamps a value of the transformed edge-preserved block to a corresponding value of the quantized transform block to obtain a smoothed transform block. The clamping can be as described with respect to the function AsymmetricClamp. The smoothed transform block can be as described with respect to smoothed transform block 710 of FIG. 7.

At 612, the process 600 inverse transforms, using the transform type and the quantization data, the smoothed transform block to obtain an edge-preserved smoothed block. The edge-preserved smoothed block can be as described with respect to the edge-preserved smoothed block 712 of FIG. 7.

FIG. 8 illustrates an example 800 of an edge-preserving filter according to implementations of this disclosure. The example 800 includes a decoded image 801. For simplicity, the image 801 is shown as being of size 8×8. However, the image 801 can be an entire image or frame of video. The image 801 can be a reconstructed frame, as described above. As such, the decoded block 704 of FIG. 7 can be, or can be a portion of, the image 801. The example 800 is described with respect to filtering a pixel 802 to obtain an edge-preserved smoothed pixel value that can be a pixel of the edge-filtered decoded block 706 of FIG. 7.

The edge-preserving filter that is described with respect to FIG. 8 can be described using the pseudocode of Table III.

TABLE III

| | |
|---|---|
| 1 | weighted_sum = 0 |
| 2 | sum_weights = 0 |
| 3 | for each pixel N in 7×7 neighborhood of P: |
| 4 | d = L1 distance between 3×3 patches centered on N and P |
| 5 | w = weight_func(d) |
| 6 | weighted_sum += w * N |
| 7 | sum_weights += w |
| 8 | new_P := weighted_sum / sum_weights |

For a pixel P (e.g., the pixel 802 of FIG. 8), the pseudocode of Table III determines a new filtered value (i.e., a new smoothed and edge-preserved value), referred in at line 8 as new_P. The pixel P can be one of the pixels of the decoded block 704 and new_P can be the co-located pixel in the edge-filtered decoded block 706 of FIG. 7. For example, P can be a pixel 728 of FIG. 7 and new_P can be a co-located pixel 726 of FIG. 7. For simplicity of reference, unless the context implies otherwise, a "pixel P" means a pixel at the location indicated by P and having a pixel value of P.

At line 1, a variable weighted_sum is initialized to zero. The variable weighted_sum accumulates the sums of a pixel value multiplied by a respective weight, as further described below. At line 2, a variable sum_weights is initialized to zero. The variable sum_weights accumulates the sums of the weights of the pixels that are be used in the filtering of the pixel P. As shown in line 8, the variable sum_weights is used to normalize the accumulated weighted sums (i.e., the value of the variable weighted_sum).

At line 3, the neighborhood that is centered around the pixel P and that stretches 7×7 pixels around the pixel P is used to determine the pixel values that will be used in the smoothing of the pixel P and the respective weights that are to be applied to each of the pixels. That is, as further described below, the pseudocode of Table III iterates over the patches of neighborhood. While in the pseudocode of Table III a neighborhood of 7×7 is used, other neighborhood sizes are possible. Line 4 indicates that the 7×7 neighborhood will be considered in patches of size 3×3. Again, 3×3 is just an example and other patch sizes are possible.

At line 4, the L1 distance between a 3×3 patch centered around P and a 3×3 patch centered around a pixel N of the neighborhood of P is determined. The patch that is centered around P, where P is the pixel 802, is a patch 804. In one iteration of the pseudocode of Table III, N can be a pixel 806. As such the neighboring patch that is centered on N is a patch 808. In another iteration, N can be a pixel 810. As such the neighboring patch that is centered on N is a patch 812.

The L1 distance can be the sum of absolute differences (SAD) between the respective (i.e., co-located) pixels of the patches. As such, the L1 distance between the patch 804 and the patch 808 is =|216−216|+|232−53|+|55−22|+|44−71|+ |244−41|+|225−235|+|41−167|+|145−189|+|241− 213|=650; and the L1 distance between the patch 804 and the patch 812 is =|53−216|+|35−53|+|84−22|+|176−71|+ |215−41|+|201−235|+|194−167|+|195−189|+|95− 213|=707. As such, in the iteration that is processing the patch 808, at line 4, a variable d (i.e., distance) is set to 650; and in the iteration that is processing the patch 812, at line 4, the variable d is set to 707. At line 5, a variable w (i.e., weight) is calculated as a function of the distance d by calling the function weight_func( ) and passing the distance d as an input. In an example, the weight function can be a decaying function that gets smaller as the distance d gets larger. As such, the larger the distance is between the patch centered at the pixel P and the patch centered at the pixel N, the smaller the impact of the pixel N (i.e., how much of the value of N is contributed to new_P) will be on the smoothing of the pixel P. In an example, the weight function can be $e^{-d}$, or an approximation thereof.

While all the pixels of the patches for which a distance is calculated are used in calculating the distance, the distance is used only to determine a weight for the pixel centered at the pixel N. As such, at line 6, the weight determined at line 5 is multiplied by the value of the pixel N, which is the center of the current patch under consideration and the result is added to the accumulator weighted_sum. At line 7, the calculated weight w is accumulated in the accumulator sum_weights.

From line 7, the pseudocode iterates back to line 3 until all the patches of the 7×7 neighborhood are processed. At line 8 a new, smoothed and edge-filtered value of the pixel P is calculated as the total accumulated sum of weights (i.e., weighted_sum) divided by the total sum of the weights (i.e., sum_weights).

In some implementations, if the distance between the patch centered at P and a neighboring patch exceeds a certain threshold value, then the neighboring patch is ignored (e.g., omitted, skipped, etc.) in the calculation of new_P. That is, for example, the processing of the lines 5-7 can be skipped if the distance d, determined at line 4, exceeds the threshold. As such, determining a weight corresponding to a patch-based distance can be carried out only on condition that the patch-based distance exceeding the threshold value.

The pseudocode of Table III can be optimized to take advantage of available hardware CPU instructions (i.e., hardware instruction set, hardware instructions). For example, some Intel CPUs, which include support for Streaming SIMD Extensions (SSE4.1), include the CPU instruction MPSADBW. The MPSADBW instruction computes Multiple Packed Sums of Absolute Difference. That is, the MPSADBW instruction adds together four sum-of-absolute-differences (SAD) at each of the eight positions of a four-pixel sliding window over an 11-pixel range. As such, to take advantage of MPSADBW instruction, line 3 of the pseudocode of Table III can be changed to "for each pixel N in 7×8 neighborhood of P" and line 4 can be changed to "d=L1 distance between 3×4 patches centered on N and P."

For symmetry, for example, the patches of line 4 can be set to 4×4. However, that is not necessary. As the computation of the additional row cannot be performed directly by the CPU, there is no need to, simply for the sake of symmetry, make the patch be of size 4×4. Similarly, for symmetry, the neighboring search window can be set to 8×8. However, since MPSADBW computes eight instances of 4 pixels wide patches, it would be computationally cheaper to use all eight weights that can be calculated by the CPU instructions rather than limit the search window to 7 pixels wide. However, since the MPSADBW can be used in the column dimension, there is no need, only for the sake of symmetry, to add the extra row to make the neighborhood be 8×8 pixels wide.

Returning to FIG. 6, and as mentioned above, at 606, the process 600 applies an edge-preserving filter. The sub-steps 606_10-606_30 of 606 describe an edge-preserving filter process that is consistent with the description of FIG. 8.

At 606_10, the process 600 determines respective patch-based distances between a pixel of the decoded block and neighboring pixels. The neighboring pixels can be in a neighboring search window of the pixel, as described with respect to the pseudocode of Table III above. The distance can be a patch-based L1 distance, as described above. At 606_20, the process 600 determines respective weights corresponding to the patch-based distances. That is, for each calculated distance, a corresponding weight is calculated. At 606_30, the process 600 filters the pixel using the respective weights and the neighboring pixels. Filtering, at 606_30, can include determining a weighted sum of the neighboring pixels using the respective weights.

Figure 10:
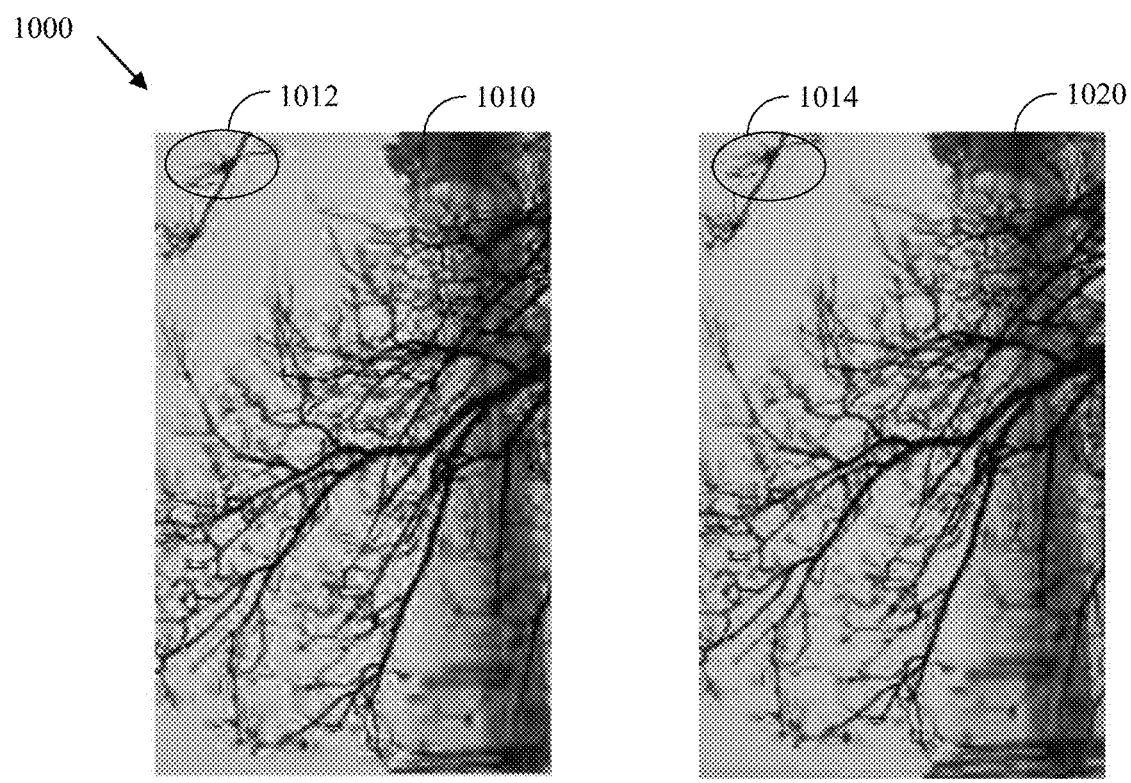
FIG. 10 is an example illustrating reducing ringing artefacts according to implementations of this disclosure.

FIG. 10 is an example 1000 illustrating reducing ringing artefacts according to implementations of this disclosure. The example 1000 includes a decoded image 1010 and a filtered image 1020. The decoded image can be as described with respect to the decoded block 704 and the filtered image 1020 can be as described with respect to the edge-preserved smoothed block 712 of FIG. 7. An area 1014 of the filtered image 1020 corresponds to an area 1012 of the decoded image 1010. Ringing is observable in both the brighter and darker directions of the base level of the area 1012. On the other hand, ringing toward the brighter direction has been cut off in the area 1014.

As mentioned above, the process 600 can be implemented in an encoder. That is, the encoder can simulate a decoder to determine (e.g., evaluate, etc.) the result that is obtained by the decoder when performing the process 600. That is, the encoder can compare the output of the process 600, which is an edge-preserved smoothed image, to the source image that is encoded by the encoder. As such, the encoder can use the process 600 in an iterative selection technique to choose the adaptive quantization field to be used by the encoder and/or transmitted to the decoder. Using the process 600 in the encoder can result, in addition to improvements to the quality of a decoded image, in a 10% reduction in bitstream size.

For simplicity of explanation, the process 600 is depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms, and/or instructions described herein. In addition or alternatively, for example, a special-purpose computer/processor, which can contain specialized hardware for carrying out any of the methods, algorithms, or instructions described herein, can be utilized.

The transmitting computing and communication device 100A and the receiving computing and communication device 100B can, for example, be implemented on computers in a real-time video system. Alternatively, the transmitting computing and communication device 100A can be implemented on a server, and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method for preserving edges in a reconstructed image, comprising:
selecting relative neighboring locations;
obtaining respective filtered pixels for pixels of the reconstructed image by steps comprising:
for each pixel of the reconstructed image, obtaining a respective filtered pixel of the respective filtered pixels by steps comprising:
selecting a pixel patch comprising the pixel and first neighboring pixels of the pixel, the first neighboring pixels being at the relative neighboring locations with respect to the pixel;
calculating respective weights for the first neighboring pixels by steps comprising:
for each neighboring pixel of the first neighboring pixels, performing steps comprising:
forming a neighboring patch comprising the neighboring pixel and second neighboring pixels, the second neighboring pixels being at the relative neighboring locations with respect to the neighboring pixel;
calculating a neighboring patch distance between the pixel patch and the neighboring pixel; and calculating a respective weight of the respective weights for the neighboring pixel based on the neighboring patch distance; and filtering the pixel using the respective weights of the first neighboring pixels and the neighboring pixels to obtain the respective filtered pixel; and obtaining an edge-preserved image using the respective filtered pixels.

2. The method of claim 1, wherein the neighboring patch distance is an L1 distance.

3. The method of claim 1, wherein the respective weight is computed as a decreasing function of the neighboring patch distance.

4. The method of claim 3, wherein the decreasing function is a decaying function that gets smaller as the neighboring patch distance gets larger.

5. The method of claim 1, wherein the relative neighboring locations of a current pixel comprise a top location, a left location, a bottom location, and a right location with respect to the current pixel.

6. An apparatus for preserving edges in a reconstructed image, comprising:
a processor that is configured to:
determine respective patch-based distances between a pixel of the reconstructed image and first neighboring pixels of the pixel by steps to:
form a pixel patch comprising the pixel and the first neighboring pixels, wherein the first neighboring pixels are at respective relative offsets with respect to the pixel;
form respective neighboring patches for the first neighboring pixels, wherein a respective neighboring patch for a first neighboring pixel comprises the first neighboring pixel and second neighboring pixels of the first neighboring pixel itself, wherein the second neighboring pixels of the first neighboring pixel itself are at the respective relative offsets with respect to the first neighboring pixel; and
calculate respective distances between the pixel patch and each of the respective neighboring patches;
determine respective weights using the respective patch-based distances; and
filter the pixel using the respective weights and the first neighboring pixels to obtain a filtered pixel of an edge-preserved image.

7. The apparatus of claim 6, wherein the first neighboring pixels of the pixel comprise a top pixel, a left pixel, a bottom pixel, and a right pixel immediately neighboring the pixel.

8. The apparatus of claim 6, wherein to calculate the respective distances between the pixel patch and each of the respective neighboring patches comprises to:
calculate a distance between the pixel patch and a respective neighboring patch of the respective neighboring patches using pair-wise differences between values of co-located pixels of the pixel patch and the respective neighboring patch.

9. The apparatus of claim 8, wherein the distance is a sum of absolute differences.

10. The apparatus of claim 8, wherein to determine respective weights using the respective patch-based distances comprises to:
calculate a respective weight of the respective weights using a decreasing function of a respective patch-based distance of the respective patch-based distances.

11. The apparatus of claim 8, wherein to filter the pixel using the respective weights and the first neighboring pixels to obtain the filtered pixel of the edge-preserved image comprises to:
obtain the filtered pixel, using the respective weights, as a weighted sum of the pixel and the first neighboring pixels.

12. The apparatus of claim 6, wherein the apparatus is a decoder or an encoder.

13. A non-transitory computer-readable storage medium, comprising executable instructions that, when executed by a processor, facilitate performance of operations for preserving edges in a reconstructed image, the operations comprising operations to:
determine respective patch-based distances between a pixel of the reconstructed image and first neighboring pixels of the pixel by operations to:
obtain respective differences of co-located pixels in a first patch centered at the pixel and a second patch centered at one of the first neighboring pixels; and
obtain one of the patch-based distances between the pixel and the one of the neighboring pixels using the respective differences;
determine respective weights using the respective patch-based distances; and
filter the pixel using the respective weights and the first neighboring pixels to obtain a filtered pixel of an edge-preserved image.

14. The non-transitory computer-readable storage medium of claim 13, wherein the first neighboring pixels of the pixel comprise a top pixel, a left pixel, a bottom pixel, and a right pixel immediately neighboring the pixel.

15. The non-transitory computer-readable storage medium of claim 13, wherein to determine the respective patch-based distances between the pixel of the reconstructed image and the first neighboring pixels of the pixel comprises to:
form a pixel patch comprising the pixel and the first neighboring pixels, wherein the first neighboring pixels are at respective relative offsets with respect to the pixel;
form respective neighboring patches for the first neighboring pixels, wherein a respective neighboring patch for a first neighboring pixel comprises the first neighboring pixel and second neighboring pixels of the first neighboring pixel itself, wherein the second neighboring pixels of the first neighboring pixel itself are at the respective relative offsets with respect to the first neighboring pixel; and
calculate respective distances between the pixel patch and each of the respective neighboring patches.

16. The non-transitory computer-readable storage medium of claim 15, wherein to calculate the respective distances between the pixel patch and each of the respective neighboring patches comprises to:
calculate a distance between the pixel patch and a respective neighboring patch of the respective neighboring patches using pair-wise differences between values of co-located pixels of the pixel patch and the respective neighboring patch.

17. The non-transitory computer-readable storage medium of claim 16, wherein the distance is a sum of absolute differences.

18. The non-transitory computer-readable storage medium of claim 16, wherein to determine the respective weights using the respective patch-based distances comprises to:

calculate a respective weight of the respective weights using a decreasing function of a respective patch-based distance of the respective patch-based distances.

19. The non-transitory computer-readable storage medium of claim 16, wherein to filter the pixel using the respective weights and the first neighboring pixels to obtain the filtered pixel of the edge-preserved image comprises to:

obtain the filtered pixel, using the respective weights, as a weighted sum of the pixel and the first neighboring pixels.

\* \* \* \* \*